United States Patent
Salter et al.

(10) Patent No.: US 11,912,206 B2
(45) Date of Patent: Feb. 27, 2024

(54) SPARE TIRE WITH SOUND EXCITER

(71) Applicant: Ford Global Technologies, LLC, Dearborn, MI (US)

(72) Inventors: Stuart C. Salter, White Lake, MI (US); Paul Kenneth Dellock, Northville, MI (US); David Brian Glickman, Southfield, MI (US); Annette Lynn Huebner, Highland, MI (US); John Robert Van Wiemeersch, Novi, MI (US); Jeffrey Robert Seaman, Brownstown, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 103 days.

(21) Appl. No.: 17/408,711

(22) Filed: Aug. 23, 2021

(65) Prior Publication Data

US 2023/0054205 A1 Feb. 23, 2023

(51) Int. Cl.
*B60R 11/02* (2006.01)
*B60R 11/00* (2006.01)

(52) U.S. Cl.
CPC ..... *B60R 11/0217* (2013.01); *B60R 2011/004* (2013.01)

(58) Field of Classification Search
CPC .............. B60R 11/0217; B60R 2011/004
See application file for complete search history.

(56) References Cited

U.S. PATENT DOCUMENTS

| 2,109,681 | A | 3/1938 | Page | |
| 6,278,787 | B1 * | 8/2001 | Azima | H04R 1/24 381/152 |
| 8,204,244 | B2 * | 6/2012 | Ludwig | B60R 11/0217 381/86 |
| 2005/0013453 | A1 * | 1/2005 | Cheung | H04R 7/045 381/334 |
| 2006/0291687 | A1 * | 12/2006 | Maekawa | H04R 1/2842 381/389 |
| 2007/0261911 | A1 * | 11/2007 | Nichols | H04R 1/2826 181/150 |
| 2009/0066499 | A1 | 3/2009 | Bai et al. | |
| 2014/0131134 | A1 * | 5/2014 | Kobayashi | B60R 11/0217 181/199 |
| 2015/0365746 | A1 * | 12/2015 | Cheung | H04R 1/02 381/152 |

(Continued)

FOREIGN PATENT DOCUMENTS

CN 207809223 U * 9/2018 ............... B60R 5/04
CN 207809223 U 9/2018

(Continued)

*Primary Examiner* — Oyesola C Ojo
(74) *Attorney, Agent, or Firm* — Vichit Chea; Carlson, Gaskey & Olds, P.C.

(57) ABSTRACT

An apparatus includes, among other things, a spare tire cover comprising an attaching ring configured to surround an outer circumference of a tire and a center panel that is attached to the attaching ring. At least one exciter is mounted to the center panel. A method includes, among other things, molding at least one temperature sensor to a center panel, mounting the center panel to enclose one open side of an attaching ring to form a spare tire cover, and mounting at least one exciter to the center panel to selectively generate a desired sound.

28 Claims, 2 Drawing Sheets

(56) References Cited

U.S. PATENT DOCUMENTS

| | | | | |
|---|---|---|---|---|
| 2017/0347186 A1* | 11/2017 | Denneulin | | H04R 7/045 |
| 2020/0295647 A1* | 9/2020 | Choi | | H02K 33/12 |
| 2021/0016846 A1* | 1/2021 | Fischer | | B62D 43/005 |
| 2021/0289295 A1* | 9/2021 | Wei | | H03G 7/002 |
| 2021/0337315 A1* | 10/2021 | Pankiang | | H04R 3/00 |
| 2021/0409865 A1* | 12/2021 | Dayan | | H04R 3/007 |

FOREIGN PATENT DOCUMENTS

| | | | | |
|---|---|---|---|---|
| CN | 110834401 A | * | 2/2020 | B29C 45/0001 |
| EP | 1713297 B1 | | 10/2013 | |
| JP | 2000043765 A | * | 2/2000 | B62D 43/02 |

* cited by examiner

SPARE TIRE WITH SOUND EXCITER

TECHNICAL FIELD

This disclosure relates generally to an exciter for a vehicle that is mounted to a cover for a spare tire.

BACKGROUND

Vehicles can include Acoustic Vehicle Alerting Systems (AVAS) speakers. The AVAS speakers emit sounds that can be communicated to vehicle users and pedestrians. These speakers can be expensive, bulky, and difficult to package. More cost effective solutions are sought after.

SUMMARY

An apparatus according to an exemplary aspect of the present disclosure includes, among other things, a spare tire cover comprising an attaching ring configured to surround an outer circumference of a tire and a center panel that is attached to the attaching ring. At least one exciter is mounted to the center panel.

In a further non-limiting embodiment of the foregoing apparatus, the attaching ring is made from a first material and the center panel is made from a second material different than the first material.

In a further non-limiting embodiment of any of the foregoing apparatus, at least one of the attaching ring and center panel comprises a plastic or metal material.

In a further non-limiting embodiment of any of the foregoing apparatus, at least one of the attaching ring and center panel comprises sheet molding compound with reinforcing fibers.

In a further non-limiting embodiment of any of the foregoing apparatus, at least one temperature sensor measures a temperature of the center panel.

In a further non-limiting embodiment of any of the foregoing apparatus, the at least one temperature sensor is embedded within the center panel.

In a further non-limiting embodiment of any of the foregoing apparatus, the at least one exciter comprises a sound generating speaker that is mounted to an inner surface of the center panel to be hidden from external view when the spare tire cover is mounted to the tire.

In a further non-limiting embodiment of any of the foregoing apparatus, the at least one exciter is selectively powered to generate a desired sound.

In a further non-limiting embodiment of any of the foregoing apparatus, the attaching ring comprises a strip extending from a first end to a second end, and wherein the first and second ends are selectively coupled together to form a ring shape that surrounds the outer circumference of the tire and has first and second open sides.

In a further non-limiting embodiment of any of the foregoing apparatus, the tire is insertable through the first open side and wherein the attaching ring includes an inwardly extending flange formed about the second open side, and wherein the center panel is seated on the inwardly extending flange to enclose the tire within the spare tire cover.

In a further non-limiting embodiment of any of the foregoing apparatus, a latch secures the first and second ends together.

In a further non-limiting embodiment of any of the foregoing apparatus, the at least one exciter comprises a sound generating speaker, a power source supplies power to the at least the exciter, and a controller controls power supplied to the at least one exciter.

In a further non-limiting embodiment of any of the foregoing apparatus, at least one temperature sensor measures a temperature of the center panel and communicates temperature data to the controller to adjust the power supplied to the at least the exciter based on the temperature of the center panel.

An apparatus, according to yet another exemplary aspect of the present disclosure includes, among other things, a spare tire, a cover comprising an attaching ring that surrounds an outer circumference of the spare tire, and a center panel that is attached to the attaching ring. At least one exciter is mounted to the center panel and includes a sound generator. At least one temperature sensor measures a temperature of the center panel. A power source supplies power to the at least one exciter, and a control controls power supplied to the at least one exciter based on the temperature of the center panel.

In a further non-limiting embodiment of any of the foregoing apparatus, the at least one temperature sensor is embedded within the center panel.

In a further non-limiting embodiment of any of the foregoing apparatus, the attaching ring comprises a strip extending from a first end to a second end, and wherein the first and second ends are selectively coupled together to form a ring shape that surrounds the outer circumference of the tire and has first and second open sides, and including a latch to secure the first and second ends together.

In a further non-limiting embodiment of any of the foregoing apparatus, the tire is insertable through the first open side and wherein the attaching ring includes an inwardly extending flange formed about the second open side, and wherein the center panel is seated on the inwardly extending flange to enclose the tire within the spare tire cover.

A method, according to yet another exemplary aspect of the present disclosure includes, among other things: molding at least one temperature sensor to a center panel; mounting the center panel to enclose one open side of an attaching ring to form a spare tire cover; and mounting at least one exciter to the center panel to selectively generate a desired sound.

In a further non-limiting embodiment of the foregoing method, the at least one exciter is selectively powered to generate a desired sound.

In a further non-limiting embodiment of any of the foregoing methods, the method includes providing power to the at least one exciter with a power source, and controlling the power supplied to the at least one exciter based on a temperature of the center panel.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details an exemplary exciter incorporated into a vehicle panel. The exciter is mounted to effectively transmit sound to a surrounding environment and to selectively generate desired sound profiles and/or to serve as an alarm. By incorporating an exciter feature into an existing vehicle component to create a speaker effect, the number of AVAS speakers on the vehicle can be reduced for cost saving purposes.

Figure 1:
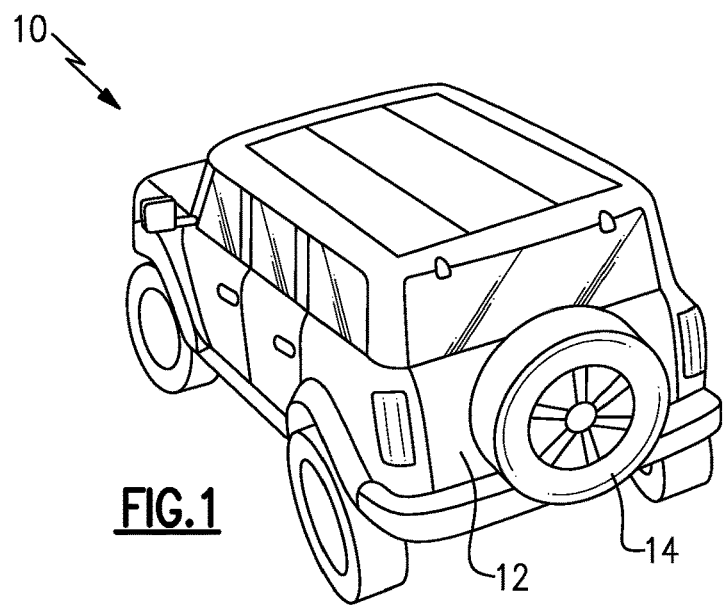
FIG. 1 is an illustration of a vehicle having a spare tire on a rear door.
Figure 2:
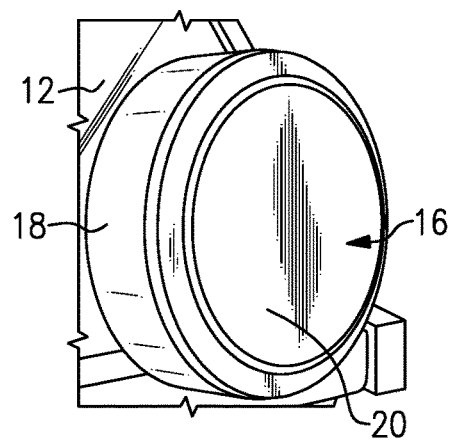
FIG. 2 is a perspective view of a cover that is used to enclose and protect the spare tire.
Figure 3:
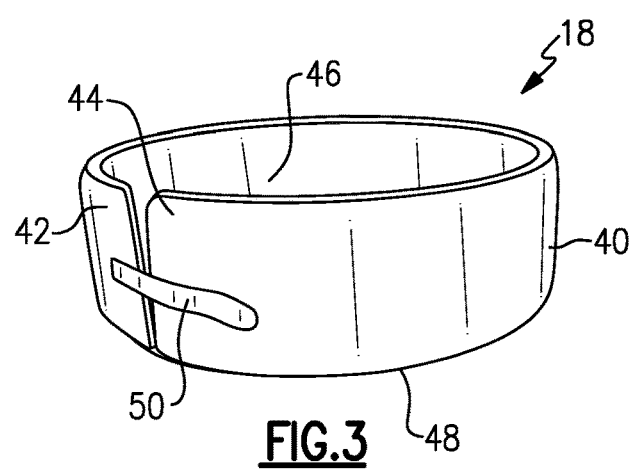
FIG. 3 is a side view of the cover of FIG. 2.

FIG. 1 shows a vehicle 10 having a rear door panel 12 that supports a spare tire 14 that is configured to receive a cover 16 as shown in FIG. 2. In one example, the cover 16 comprises an attaching ring 18 that surrounds an outer circumference of the spare tire 14 and a center panel 20 that is attached to the attaching ring 18. At least one exciter 22 (FIG. 5) is mounted to the center panel 20 to generate a desired noise.

The combination of the exciter 22 and center panel 20 comprises a speaker that can be used in many ways. For example, it can be a spare tire alarm to deter theft, it can be part of an entertainment center and be used as an auxiliary speaker for a sound system, and/or it can be an alarm that will be used in combination with existing cameras and sensors to alert vehicle occupants if a person or animal is approaching the vehicle. It can also be used to generate a desired powertrain sound profile tailored to different on-road and off-road driving conditions. By packaging the exciter 22 into the spare tire cover 16, an inexpensive speaker solution is provided to accomplish all of these benefits.

In one example, at least one temperature sensor 24 is mounted to the center panel 20 to measure a temperature of the center panel 20.

In one example, the attaching ring 18 is made from a first material and the center panel 20 is made from a second material different than the first material. In one example, the cover 16 has a hard plastic composite or metal center panel 20 and a decorated attaching ring 18 that has a latch at the bottom. In one example, a sheet molding compound (SMC) material is used for the center panel 20. In one example, the center panel 20 is molded SMC made from a thermoset polyester polymer resin that is reinforced with fibers such as fiber glass, carbon fiber or basalt. Other resins such as vinyl, ester, or epoxy resins can also be used. In another example, the attaching ring 18 and center panel 20 can be made from a common material. Any suitable material for generating noise can be used for supporting the speaker, e.g. plastic, metal, SMC with reinforcing fibers, etc.

In one example, the attaching ring 18 is made from stainless steel. In one example, the ring 18 is roll formed, cut to length, and then stretch bent around a mandrel. Steel or aluminum materials can also be used; however, stainless steel since is more corrosion resistant and has good resistance to dents.

Figure 5:
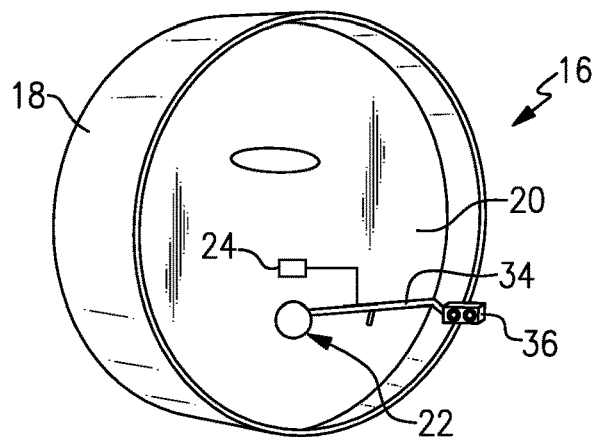
FIG. 5 is a schematic view of an exciter mounted to the cover.
Figure 6:
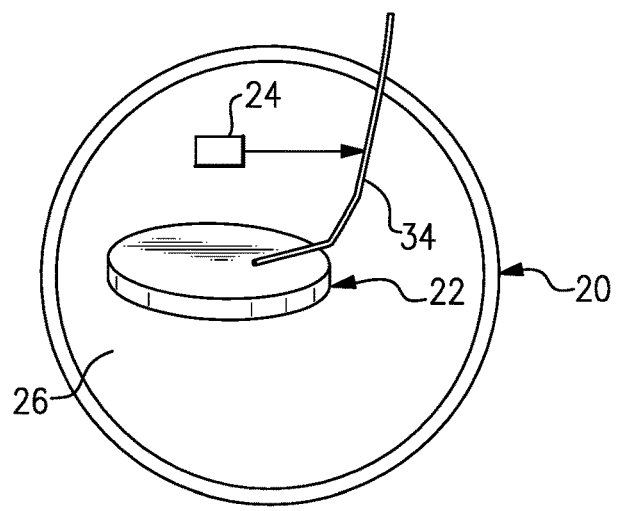
FIG. 6 is an enlarged schematic view of the exciter of FIG. 5.

In one example, the exciter 22 is mounted to an inner surface 26 of the center panel 20 to be hidden from external view when the cover 16 is mounted to the tire 14. In one example, the sound exciter 22 is attached to the center panel 20 with adhesive. In one example, the sound exciter 22 is positioned on a lower central portion of the center panel 20 as shown in FIG. 5. The SMC center panel 20 is very stiff and when excited by the sound exciter 22, it will reproduce a high-quality sound.

Figure 7:
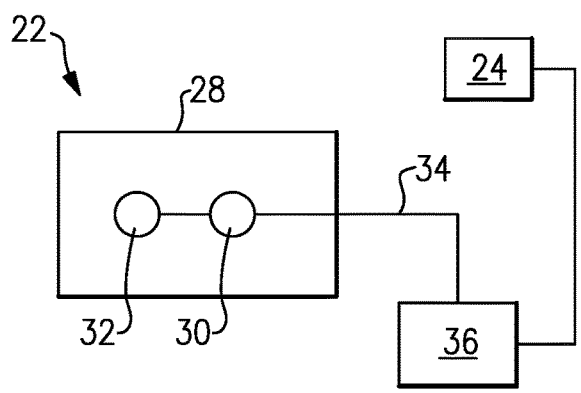
FIG. 7 is a schematic representation of the components of the exciter.

In one example, the exciter 22 includes a housing 28 (FIG. 7) with internal components such as a driver/actuator 30 and voice coil 32 that are used to generate sound. The driver/actuator 30 can be a motor assembly, for example. The voice coil 32 is coupled directly to the mount surface 26 of the center panel 22, which allows it to amplify the sound and make it a "speaker." The exciter 22 includes a wire connection 34 to a power source and control module 36. In one example, the control module 36 comprises a processor, memory, and one or more input and/or output device interfaces that are communicatively coupled via a local interface. The controller 36 may be a hardware device for executing software and can be a custom made or commercially available processor, a central processing unit, microprocessor or generally any device for executing software instructions. When it is determined that the exciter 22 is to communicate a noise to the surrounding environment, the control module 36 generates a signal that is transmitted to the exciter 22 and it begins to vibrate at the frequency of the signal. These vibrations transfer through the mount surface 26 to emit the desired sound.

In one example, the wire connection 34 connects to an existing wire harness that is used with a camera or back-up sensor associated with the spare tire 14. In another example, if the spare tire 14 does not already have a wire harness for other purposes, the connection to the exciter 22 can be done via wireless power delivery with wireless audio delivery. In an additional example, even on vehicles with a wire harness for a camera or back-up sensor, the connection to the exciter 22 can be done via wireless power delivery with wireless audio delivery to allow greater convenience when removing the tire cage and tire assembly (i.e., user does not need to disconnect wires).

As discussed above, at least one temperature sensor 24 is mounted to the center panel 20 to measure a temperature of the center panel 20. In one example, the control module 36 controls power supplied to the exciter 22 based on the temperature of the center panel 20. The stiffer the center panel 20 is, the more efficiently the exciter 22 works; however, the stiffness of plastic material varies considerably with temperature (especially with darker colored wheel covers in the sun in hot climates, for example).

Temperatures of 60° C. in the sun would not be unusual for the exterior temperatures in certain climates. The elastic modulus (MPa) for certain polymers can decrease significantly with increasing temperatures. For example, a nylon 6 material can have an elastic modulus that decreases from about 2800 MPa at 25° C. to as low as about 1500 MPa at 60° C. When the center panel 20 is cold it takes less power to get the same amount of sound out of the panel 20. Thus, as the external temperature increases there needs to be power compensation to keep the volume at the correct level.

The temperature sensor 24 measures the temperature of the center panel 20. The temperature data is then communicated to the control module 36, which varies the power supplied to the exciter 22 accordingly to compensate for temperature variations. In one example, the temperature compensation is executed by a look-up table of temperature vs. power compensation and would depend on the type of material and reinforcement used to form the center panel 20. Thus, when the temperature increases, the panel becomes less stiff and the control module 36 will then increase the power supplied to the exciter 22 to compensate.

In one example, the temperature sensor 24 is insert molded into the center panel 20. Thus, the temperature sensor 24 is embedded and completely enclosed within the material that forms the center panel 20. The temperature sensor 24 can be coupled to the wire harness or can communicate wirelessly with the control module 36.

Figure 4:
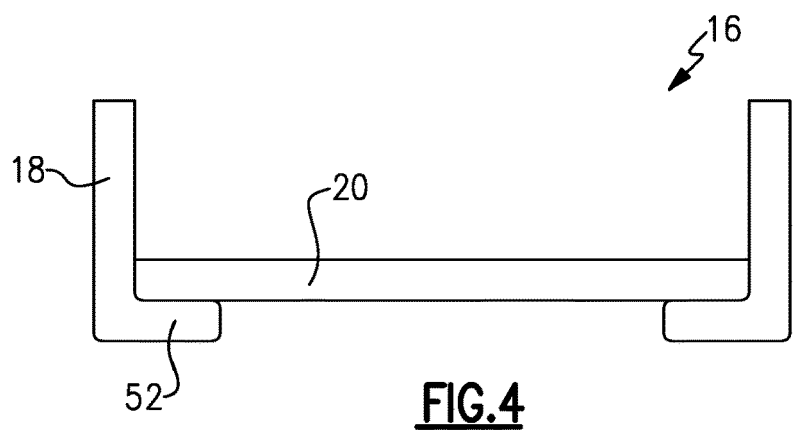
FIG. 4 is a schematic view of an attachment interface between a ring and center plate of the cover of FIG. 2.

In one example, the attaching ring 18 comprises a strip body 40 extending from a first end 42 to a second end 44. The first 42 and second 44 ends are selectively coupled together to form a ring shape that surrounds the outer circumference of the tire 14. This results in the ring 18 having first 46 and second 48 open sides that surround a center axis. A lockable latch 50 is used to secure the first 42 and second 44 ends together such that the ring 18 can secure the cover 16 to the tire 14. In one example, the attaching ring 18 includes an inwardly extending flange 52 (FIG. 4) formed about the second open side 48. In one example, the center panel 20 is seated on the inwardly extending flange 52 to enclose the second open side 48. The tire 14 is insertable through the first open side 46 and the latch 50 is then secured to attach the cover to the tire 14. Any type of lockable latch can be used to connect the ends 42, 44 together.

By packaging the exciter 22 in the spare tire cover 16 it avoids having to use AVAS speakers, which are bulky and hard to package. By adding the sound exciter 22 to the wheel cover 16 a speaker is created that has several uses. In one example, the existing vehicle sensors, e.g. front park, BUS (Blind Info System) sensors, back-up sensors, etc., can be used to detect if a person or animal approaches the vehicle, and then the exciter 22 can be activated to set off an alarm noise if motion is detected that will alert occupants and scare away any intruders. Additionally, theft can be deterred by generating an alarm sound in response to a thief attempting to remove the cover 16 and/or spare tire 14.

In one example, by sending a 450/550 Hz signal to the exciter 22 in the wheel cover 16, the vehicle 10 can simulate a traffic trumpet horn (traditionally located at a front of a vehicle), which would allow a panic alarm and/or car finder chirps to be emitted from both the front and rear of the vehicle 10. When the attaching ring 18 is unbuckled while the vehicle security system is armed, an alarm signal could also be sent to both the traffic horn and the rear wheel cover exciter 22. Also, through use of a small battery in the wheel, an alarm could also be attached to the wheel itself.

Another use of the exciter 22 is for entertainment purposes. The exciter 22 can be activated to play music during parties or tailgating gatherings. The wheel cover 16 can be used as an exterior speaker that can add music or provide running commentary of sporting events. The sound exciter option can be selected by the user via an internal touch screen, a mobile device app, or computer/laptop cloud connection, for example, with the option to shut off interior speakers so that power is saved.

Another use of the exciter 22 is for providing enhanced powertrain noise. Vehicles can have many unique driving modes such as Normal, Eco, Sport, Slippery, Sand, Baja, Mud, Ruts, and Rock Crawl, for example. Many vehicle users like to have unique, enhanced engine sounds that would be unique for each mode and that can be heard from the inside of the vehicle and outside the vehicle. During Normal, Eco and Slippery modes the vehicle can be quiet so no noise enhancements are needed, but during sport modes a louder sound is generated, and during Baja, Mud/Ruts, and Rock Crawl modes, a rugged growling sound could be used, for example. The inside sound can be overlaid on to the interior audio system. The exciter 22 will provide the speaker that will be used to enhance the exhaust sound for each driving mode giving a unique sound for sporty or off-road driving. In one example, the engine sounds and/or volume are synchronized to engine RPM, gear, and vehicle speed. In one example, the owner will have the option of customizing sounds (similar to audio equalizer) and volume through an interior touch screen, a mobile device app, or computer/laptop cloud connection.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An apparatus, comprising:
   a spare tire cover removable from a vehicle and comprising an attaching ring configured to surround an outer circumference of a tire and a center panel that is attached to the attaching ring; and
   at least one exciter mounted to the center panel such that the center panel produces a desired sound, wherein the at least one exciter comprises a sound generating speaker, a power source to supply power to the at least one exciter, and a controller that controls power supplied to the at least one exciter.

2. The apparatus according to claim 1, wherein the attaching ring is made from a first material and the center panel is made from a second material different than the first material.

3. The apparatus according to claim 1, wherein at least one of the attaching ring and center panel comprises a plastic or metal material.

4. The apparatus according to claim 1, wherein at least one of the attaching ring and center panel comprises sheet molding compound with reinforcing fibers.

5. An apparatus, comprising:
   a spare tire cover removable from a vehicle and comprising an attaching ring configured to surround an outer circumference of a tire and a center panel that is attached to the attaching ring;
   at least one exciter mounted to the center panel such that the center panel produces a desired sound; and
   at least one temperature sensor that measures a temperature of the center panel.

6. The apparatus according to claim 5, wherein the at least one temperature sensor is embedded within the center panel.

7. The apparatus according to claim 1, wherein the sound generating speaker is mounted to an inner surface of the center panel to be hidden from external view when the spare tire cover is mounted to the tire.

8. The apparatus according to claim 1, wherein the at least one exciter is selectively powered to generate a desired sound.

9. The apparatus according to claim 1, wherein the attaching ring comprises a strip extending from a first end to a second end, and wherein the first and second ends are selectively coupled together to form a ring shape that surrounds the outer circumference of the tire and has first and second open sides.

10. An apparatus, comprising:
a spare tire cover removable from a vehicle and comprising an attaching ring configured to surround an outer circumference of a tire and a center panel that is attached to the attaching ring, wherein the attaching ring comprises a strip extending from a first end to a second end, and wherein the first and second ends are selectively coupled together to form a ring shape that surrounds the outer circumference of the tire and has first and second open sides;
at least one exciter mounted to the center panel such that the center panel produces a desired sound; and
wherein the tire is insertable through the first open side and wherein the attaching ring includes an inwardly extending flange formed about the second open side, and wherein the center panel is seated on the inwardly extending flange to enclose the tire within the spare tire cover.

11. The apparatus according to claim 9, including a latch to secure the first and second ends together.

12. The apparatus according to claim 1, including at least one temperature sensor to measure a temperature of the center panel and communicate temperature data to the controller to adjust the power supplied to the at least one exciter based on the temperature of the center panel.

13. An apparatus comprising:
a spare tire supported by a vehicle;
a cover removable from the vehicle and comprising an attaching ring that surrounds an outer circumference of the spare tire and a center panel that is attached to the attaching ring;
at least one exciter mounted to the center panel and including a sound generator configured to vibrate the center panel to emit a desired sound;
at least one temperature sensor that measures a temperature of the center panel;
a power source to supply power to the at least one exciter; and
a control that controls power supplied to the at least one exciter based on the temperature of the center panel.

14. The apparatus according to claim 13, wherein the at least one temperature sensor is embedded within the center panel.

15. The apparatus according to claim 13, wherein the attaching ring comprises a strip extending from a first end to a second end, and wherein the first and second ends are selectively coupled together to form a ring shape that surrounds the outer circumference of the spare tire and has first and second open sides, and including a latch to secure the first and second ends together.

16. The apparatus according to claim 15, wherein the spare tire is insertable through the first open side and wherein the attaching ring includes an inwardly extending flange formed about the second open side, and wherein the center panel is seated on the inwardly extending flange to enclose the spare tire within the cover.

17. A method comprising:
molding at least one temperature sensor to a center panel;
mounting the center panel to enclose one open side of an attaching ring to form a spare tire cover that is removable from a vehicle; and
mounting at least one exciter to the center panel such that the center panel to selectively generate a desired sound; and
controlling the at least one exciter based on a temperature of the center panel.

18. The method according to claim 17, wherein the at least one exciter is selectively powered to generate a desired sound.

19. The method according to claim 17, including providing power to the at least one exciter with a power source, and controlling the power supplied to the at least one exciter based on a temperature of the center panel.

20. The method according to claim 19, including increasing power as the temperature of the center panel increases to keep a volume at a desired level.

21. The method according to claim 17, including selectively removing the spare tire cover from a vehicle to allow access to a spare tire.

22. The method according to claim 17, wherein the center panel has an inner surface facing an external surface of a spare tire and an outer surface facing an outside environment, and including mounting the at least one exciter to the inner surface of the center panel such that the at least one exciter is outward of, and separate from, the spare tire and protected by the center panel when the spare tire cover covers the spare tire.

23. The apparatus according to claim 13, wherein the control increases power as the temperature of the center panel increases to keep a volume at a desired level.

24. The apparatus according to claim 13, wherein the spare tire is external to the vehicle and supported on a rear door panel, and wherein the cover is selectively removable from the vehicle to allow access to the spare tire.

25. The apparatus according to claim 13, wherein the center panel has an inner surface facing an external surface of the spare tire and an outer surface facing an outside environment, and wherein the at least one exciter is mounted to the inner surface of the center panel such that the at least one exciter is outward of, and separate from, the spare tire and protected by the center panel when the cover covers the spare tire.

26. The apparatus according to claim 5, wherein power supplied to the at least one exciter increases as the temperature of the center panel increases to keep a volume at a desired level.

27. The apparatus according to claim 1, wherein the spare tire cover is selectively removeable from a vehicle to allow access to a spare tire.

28. An apparatus, comprising:
a spare tire cover removable from a vehicle and comprising an attaching ring configured to surround an outer circumference of a tire and a center panel that is attached to the attaching ring, wherein the center panel has an inner surface facing an external surface of a spare tire and an outer surface facing an outside environment; and
at least one exciter mounted to the center panel such that the center panel produces a desired sound, and wherein the at least one exciter is mounted to the inner surface of the center panel such that the at least one exciter is outward of, and separate from, the spare tire and protected by the center panel when the spare tire cover covers the spare tire.

* * * * *